United States Patent [19]
Miller et al.

[11] Patent Number: 5,359,439
[45] Date of Patent: Oct. 25, 1994

[54] OPTICAL ELEMENTS BASED ON LIQUID-CRYSTALLINE SUBSTANCES WITH NO BIREFRINGENCE IN A NON-PERPENDICULAR DIRECTION AND A PROCESS FOR THEIR PREPARATION

[75] Inventors: Alfred Miller, Planegg; Horst Leigeber, Oberhaching; Franz-Heinrich Kreuzer, Planegg, all of Fed. Rep. of Germany

[73] Assignee: Consortium für elektrochemische Industrie GmbH, Munich, Fed. Rep. of Germany

[21] Appl. No.: 11,587

[22] Filed: Feb. 1, 1993

[30] Foreign Application Priority Data

Feb. 27, 1992 [DE] Fed. Rep. of Germany ....... 4206089

[51] Int. Cl.$^5$ .................... G02F 1/1337; G02F 1/137; G02F 1/13
[52] U.S. Cl. ........................................ 359/76; 359/93; 359/98
[58] Field of Search ............................. 359/76, 93, 98

[56] References Cited

U.S. PATENT DOCUMENTS

| | | | |
|---|---|---|---|
| 4,410,570 | 10/1983 | Kreuzer et al. | 427/374.1 |
| 5,032,009 | 7/1991 | Gibbons et al. | 359/76 |
| 5,073,294 | 12/1991 | Shannon et al. | 359/76 |
| 5,098,978 | 3/1992 | Riepl et al. | 528/15 |

FOREIGN PATENT DOCUMENTS

| | | |
|---|---|---|
| 0397263 | 11/1990 | European Pat. Off. |
| 3808430 | 9/1989 | Fed. Rep. of Germany |
| 3920420 | 1/1991 | Fed. Rep. of Germany |
| 39204421 | 1/1991 | Fed. Rep. of Germany |

OTHER PUBLICATIONS

320 Applied Physics Letters, vol. 60, (6 Jan., 1992) No. 1, New York, U.S. "Optically induced and erased birefringence and dichroism in azoaromatic polymers".
8327 Nikkei High Tech Report IV (1989) Jan. 9, No. 5, Tokyo, JP "Exotic Combination of Materials Yields Viable Liquid–Crystal Recording Medium".
Letters to Nature, vol. 351, Research Ceter, Hercules Inc., Wilmington, Del. 19894, U.S., May 2, 1991, Gibbons et al., "Surface-mediated alignment of nematic liquid crystals with polarized laser light".
G. Allen & J. C. Bevington Eds., Comprehensive Polymer Science, vol. 5, pp. 701–732, Pergamon Press (1989) "Polymers with Main–chain Mesogenic Units".
Ullmanns Encyklopädie der technischen Chemie, vol. 4, No. 11, 657–671, Verlag Chemie 1976 "Erdöl und Erdgas bis Formazanfarbstoffe".
Encyclopedia of Polymer Science and Engineering, vol. 9, 2nd Ed., pp. 1–61, J. Wiley & Sons 1987 "Liquid Crystalline Polymers to Mining Applications".
Bermann-Schaefer, Lehrbuch der Experimentalphysik, vol. III: Optik, 7th Ed. (1987), pp. 560–567.
De Vries, Acta Cryst. (1951), vol. 4 pp. 219–226, Netherlands "Rotary Power and Other Optical Properties of Certain Liquid Crystals".
Journal of Fusion Energy, vol. 5, No. 1, 1986, Stephen D. Jacobs "Liquid Crystal Devices for Laser Systems".
H. J. Eberle, A. Miller and F.-H. Kreuzer, Liquid Crys-
(List continued on next page.)

*Primary Examiner*—Anita P. Gross
*Attorney, Agent, or Firm*—Martin Connaughton

[57] ABSTRACT

The invention relates to optical elements based on liquid-crystalline substances, and to a process for the production thereof. The optical elements based on liquid-crystalline substances are ones which exhibit no birefringence in a defined direction of incidence, optical elements in which no birefringence occurs perpendicularly to the surface being excepted. The process for preparing the optical elements comprises illuminating a liquid-crystalline substance with unpolarized light of suitable wavelength at a defined angle in such a way that, after illumination, the director of this substance is aligned parallel to the direction of the illuminating light on passing through said substance.

10 Claims, 7 Drawing Sheets

OTHER PUBLICATIONS tals, (1989), vol. 5, No. 3, pp. 907–916 "Inverse angle dependence of the reflection colours of cholesteric polymeric liquid crystals mixed with pigments".

J. Am. Chem. Soc. 1989, vol. 111, No. 21 pp. 8119–8125, J. W. Goodby et al. "A New Molecular Ordering in Helical Liquid Crystals".

Liquid Crystals, 1991, vol. 10, No. 4, pp. 445–456, T. J. Bunning et al. "Bilayer structures in cholesteric, cyclic-siloxane liquid crystals".

D. Demus, L. Richter, Verlag Chemie Weinheim, New York 1978 "Textures of Liquid Crystals", pp. 16–18.

J. Chatt, L. M. Vallarino, L. M. Venanzi, J. Chem. Soc. (London) (1957) pp. 2496–2505 "Olefin Co-ordination Compounds Part IV".

H. C. Clark and L. E. Manzer, J. Organometallic Chemistry vol. 59 (1973), pp. 411–428 "Reactions of ($\pi$-1,-5-Cylooctadiene)organoplatinum(II) compounds and the synthesis of perfluoroalkylplatinum complexes".

Meier G., Physical Properties of Liquid Crystals, ed.: Meier, Sackmann, Grabmeier, Springer Verlag (1975), pp. 9–11.

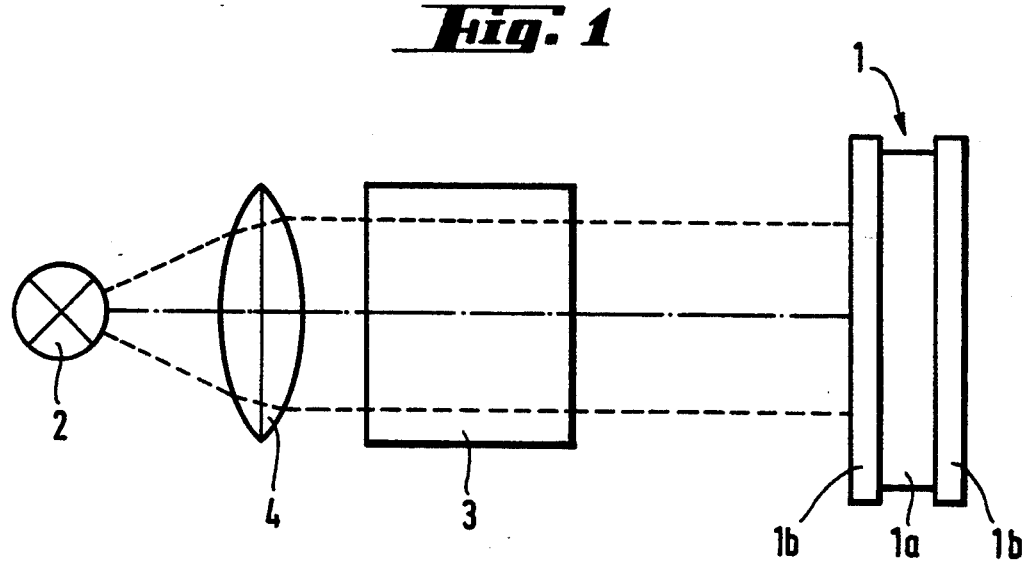
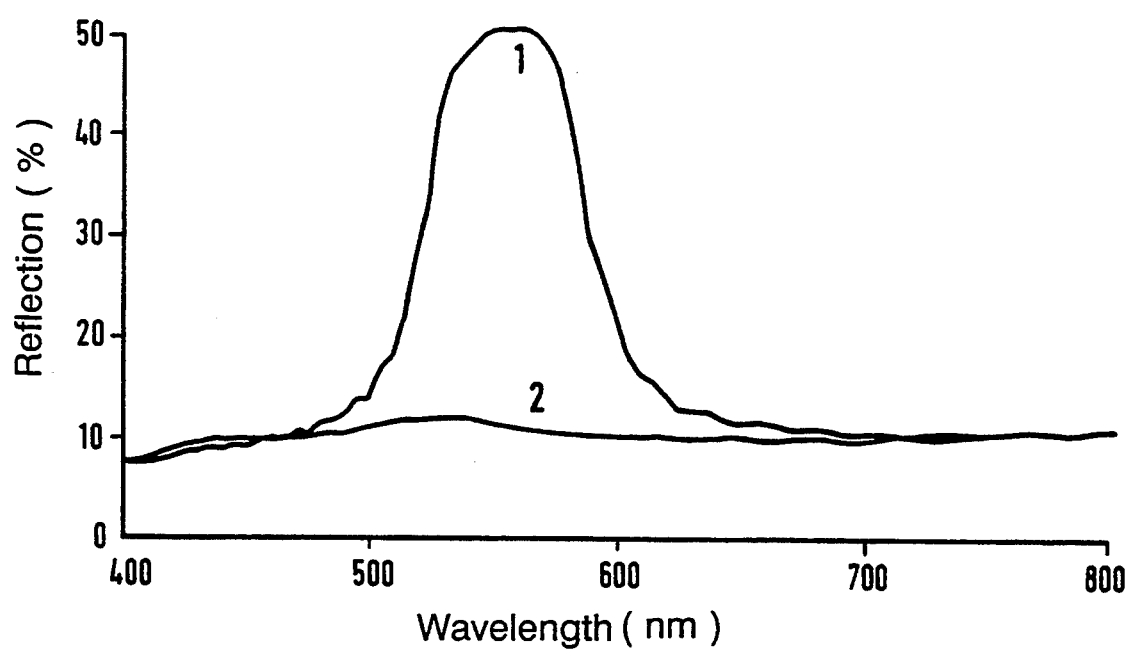

OPTICAL ELEMENTS BASED ON LIQUID-CRYSTALLINE SUBSTANCES WITH NO BIREFRINGENCE IN A NON-PERPENDICULAR DIRECTION AND A PROCESS FOR THEIR PREPARATION

The invention relates to optical elements based on liquid-crystalline substances, and a process for their preparation.

BACKGROUND OF THE INVENTION

Between the solid crystalline phase and the fluid melt, intermediate phases occur in certain substances which combine structural and dynamic properties of both the ordered crystalline state and of the unordered melt state. Although these phases are fluid, they have, for example, optical properties which are characteristic of the majority of crystalline, but also partially crystalline substances. They are, for example, birefringent or have dielectric anisotropy. These are referred to as intermediate phases (mesophases) or alternatively liquid-crystalline phases. These phases can be obtained by varying the temperature, i.e., thermotropic liquid crystals, or in solution by varying the concentrations. Hereinafter, we are only concerned with thermotropic liquid crystals.

The existence ranges of these intermediate phases are generally characterized by, for example, transition temperatures, determined calorimetrically or by means of a polarizing microscope, from the crystalline state to the liquid-crystalline state (glass transition temperature) and from the liquid-crystalline state to the isotropic melt (clearing point) (cf. G. Allen & J. C. Bevington, Eds., Comprehensive Polymer Science, Vol. 5, pp. 701–732, Pergamon Press, 1989). If different liquid-crystalline states are present, the set of corresponding transition temperatures is indicated.

The structure of the liquid-crystalline phases is characterized by a different long-range and short-range degree of ordering of the molecules. A distinction is made between nematic phases, smectic phases and cholesteric phases. Cholesteric phases are also known as chiral nematic phases or twisted nematic phases.

In the nematic phase, the molecular centers are distributed without order, while the long axes of the molecules are aligned parallel to one another. This is different to the state in the fluid melt, where the molecule long axes are arranged randomly.

In the smectic phases, a regular arrangement of the molecular centers in space occurs in addition to the alignment order of the nematic phase described above. This regular arrangement can be present along one, but also along two or even three, independent spatial axes. These phases are nevertheless fluid. (Cf. Ullmanns Encyclopädie der Technischen Chemie, ed. 4, vol. 11, 657–671, Verlag Chemie 1976; H. F. Mark et al. Encyclopedia of Polymer Science and Engineering, 2nd ed., vol. 9, 1–61, J. Wiley & Sons 1987).

In the cholesteric phase, layers of nematically arranged molecules are arranged one on top of the other so that a continuous helical variation of the alignment direction of the molecule long axes is produced. The molecules thus form a helical structure with the period p. The cholesteric phase thus has a helical structure. Of the liquid-crystalline phases, it has particular properties (cf., for example, Bergmann-Schaefer, Experimentalphysik, Vol. III: Optik, 7th Edition (1987), pp. 560–567, or de Vries, Acta crystallogr., (1951), 4, 219–226).

Thus, it is known that the cholesteric phase of liquid-crystalline substances in a macroscopic alignment in which the helical axes are arranged parallel to one another and perpendicular to the surface reflects light incident parallel to the helical axis (angle of incidence 0°) in a wavelength range $\gamma_{ref}$, which is determined by the period p, also known as the pitch, the refractive indices and the birefringence of the helical material (de Vries, H. I., (1951), Acta crystallogr., 4, 219; Meier, G. in: Physical Properties of Liquid Crystals, ed.: Meier, Sackmann, Grabmeier, Springer-Verlag, (1975), 9–11).

The reflected light is circular-polarized, the direction of rotation of the reflected light corresponding to the direction of rotation of the helical structure of the cholesteric phase (Jacobs, S. D., J. Fusion Energy, (186), 5(1), 65). If the helix axis is tilted by the angel α, the reflection wavelength shifts in accordance with the Bragg law to $\gamma_{ref} \times \cos(\alpha)$ (Emerle, H. J., Miller, A., Kreuzer, F.-H., Liquid Crystals, (1989), 5 (3), 907).

Other known liquid-crystalline phases having a helical structure are, for example, the $S_A{}^*$ and $S_c{}^*$ phases. In the $S_A{}^*$ phase, the molecules within the layers are in an arrangement which is analogous to the $S_A$ phase. From layer to layer, however, the molecules are twisted with respect to one another. A twisting of the smectic layers is thus obtained (J. W. Goodby et al., A New Molecular Ordering in Helical Liquid Crystals, J. Am. Chem. Soc. (1989) 111, 8119–8125; T. J. Bunning et al., Bilayer structures in cholesteric, cyclic-siloxane liquid crystals, LIQUID CRYSTALS (1991), 10(4), 445–456). In the $S_c{}^*$ phase, which is used, for example, in ferroelectric liquid-crystal displays, the tilt angle of the molecules forms a helical structure. For a suitable periodicity of the helix, selective reflection of light also occurs in this phase. These phases have the same optical properties as the cholesteric phase, which was described above.

An important property of liquid crystals is their birefringence. This is determined by the mean direction of the long molecular axes of the liquid-crystalline substance. The mean direction of said long molecular axes defines the so-called director (D. Demus, L. Richter, Textures of Liquid crystals, Verlag Chemie, Weinheim, New York 1978).

If it is desired to exploit certain anisotropic properties of these materials, they have to be suitably aligned.

Hitherto the light-induced alignment of liquid-crystalline dye-containing substances was carried out by illumination with polarized light. For example, it is known from DE 3920420 to align liquid-crystalline polymers by illumination with linear-polarized light in such a way that, after illumination, the director of the molecules lies in the plane which is generated by the direction of illumination and the perpendicular to the plane of polarization of the illuminating light. Consequently, after illumination with linear-polarized light the long molecular axes lie in one plane. Birefringence always occurs in liquid-crystalline substances aligned in this way.

Polarized light is, moreover, expensive. It is obtained either by means of a laser which emits in a polarized manner, or the light from normal lamps has to be linear-polarized. In the second case, half of the light of the lamp is lost; in addition, a limitation is imposed on the lamp powers which can be used by the polarizers.

From DE-A-3920421 it is known to align liquid crystals by means of circular-polarized light in such a way that the illuminated substance reflects circular-polarized light. Birefringence also always occurs in the liquid crystals aligned in this way.

It is furthermore known to align liquid crystals by applying an electric field in such a way that no birefringence occurs perpendicularly to the surface.

SUMMARY OF THE INVENTION

The present invention relates to optical elements based on liquid-crystalline substances which exhibit no birefringence in a defined direction of incidence, optical elements in which no birefringence occurs perpendicularly to the surface being excepted.

BRIEF DESCRIPTION OF THE FIGURES

FIG. 1 shows a diagrammatic experimental setup for carrying out the process of this invention as described in the examples, FIG. 2 shows the reflection of the sample from Example 1 at an unilluminated point 1 and an illuminated point 2.

DESCRIPTION OF THE INVENTION

Figure 3:
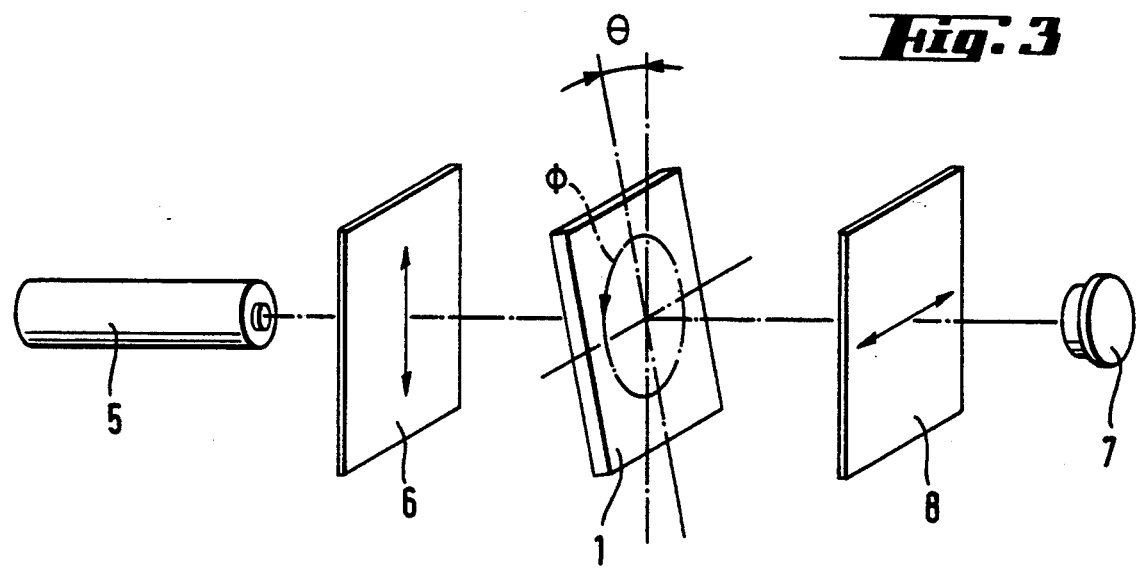
FIG. 3 shows a diagrammatic experimental setup for detecting the birefringence.

Optical elements based on liquid-crystalline substances which exhibit no birefringence in a defined direction of incidence can be obtained, for example, by illuminating a liquid-crystalline substance with unpolarized light of a suitable wavelength at a defined angle in such a way that, after illumination, the director of said substance is aligned parallel to the direction of the illuminating light on passing through said substance.

Surprisingly, it was found that liquid-crystalline substances illuminated in this way have advantageous properties. The optical elements according to this invention do not have, surprisingly, any birefringence in a defined direction of incidence.

Within the context of the invention, no birefringence means that the illuminated liquid-crystalline substance positioned between polarizers aligned perpendicularly to one another in the direction of polarization, when viewed in the direction of illumination, appears black in every position on rotation around the axis defined by the direction of illumination.

All liquid-crystalline substances which contain at least one photoisomerizable compound are suitable for producing the optical elements according to this invention, for example by means of the process of this invention.

Both low-molecular-weight liquid crystals and liquid-crystalline oligomers or polymers are suitable for this purpose. The mesogenic radicals may be present both in the main chain and in the side chain. Liquid-crystalline organopolysiloxanes are particularly suitable. Linear, cyclic or branched organopolysiloxanes are equally suitable. Organopolysiloxanes containing mesogenic radicals in the side chain are particularly preferred. These substances can be prepared, for example, as described in German Offenlegungsschrift DE-A-3808430 or in U.S. Pat. No. 4,410,570. Liquid-crystalline substances which have a glass transition temperature higher than the operating temperature of the optical components of this invention are preferably selected.

Examples of suitable photoisomerizable compounds are all the photoisomerizable dyes disclosed in DE 3 920 420. The criteria given in DE 3 920 420 for the choice of the dye F apply to the choice of suitable photoisomerizable dyes. Thus, the suitable dyes preferably experience a change in molecular geometry on exposure to light, preferably having a wavelength in the range of their absorption band. The suitable dyes preferably absorb in the range from 250 to 2000 nm. They expediently contain at least one structural element which changes its geometry on illumination. Such structural elements may contain, for example, multiple bonds, and in particular have the possibility for cis-trans isomerism. Examples which may be mentioned of structural elements A which enable isomerism are:

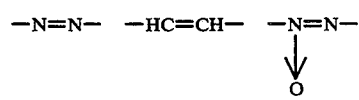

In particular, the dyes contain groups in which two aromatic rings or ring systems are connected by said structural elements A, such as, for example,

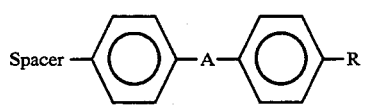

where R may be, for example, one of the following groups:

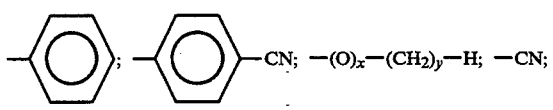

where x=0 or 1, preferably 1, and y=0 to 10, preferably 1 to 5.

The spacer provides connection to the polymer and may be, for example, one of the following groups:

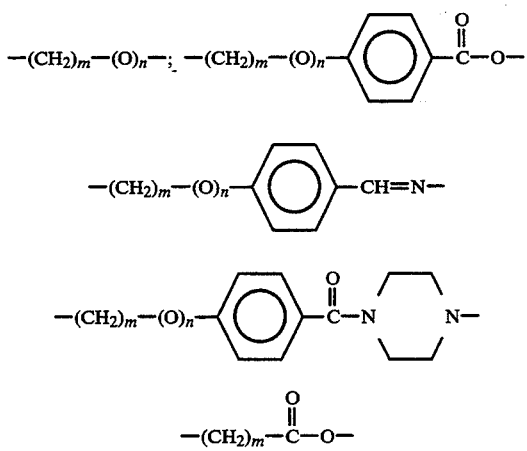

where m=0 to 10, preferably 3 to 6, and n=0 or 1.

The dyes are admixed with the liquid crystals in an amount of between 1 and 50% by weight, preferably between 5 and 40% by weight, based on the weight of the finished substance.

If desired, the dyes are covalently bonded to the liquid crystals in an amount of between 1 and 70% by weight, preferably between 5 and 50% by weight. This can be carried out, for example, by the process described in DE-A-38 08 430 or DE-A-39 20 420. The covalent bonding is necessary, for example, if the dye is immiscible with the liquid crystals.

Liquid-crystalline substances which are suitable in this way can be used in the amorphous state, unaligned or aligned in the process of this invention to produce the optical elements.

The liquid-crystalline substances can be aligned, for example, by mechanical treatment, such as shearing or on knife application, by surface effects, or by electrical or magnetic fields.

The amorphous unaligned liquid-crystalline substances or the substances, for example, aligned as described are illuminated at a certain angle with unpolarized light having an exposure energy per unit area of 100 J/cm$^2$ to 50000 J/cm$^2$, preferably with 200 J/cm$^2$ to 20000 J/cm$^2$. Higher exposure energies are not troublesome provided the substance concerned is not heated too strongly.

Unpolarized light having a wavelength in the range in which the absorption of the photoisomerizable dye of the liquid-crystalline substance lies is preferably suitable. Particular preference is given to a wavelength in the range of the absorption band of the photoisomerizable compound of the liquid-crystalline substance. The light used may be monochromatic or polychromatic, coherent or incoherent.

The illuminating light should be incident on the sample at the angle at which the optical element according to the invention does not exhibit birefringence.

The optical elements according to the invention can also be produced by processes other than the process of this invention such as, for example, by illumination with two mutually perpendicular linear-polarized light sources, the illumination to take place at the angle at which the element according to the invention does not exhibit birefringence. Production by applying suitable magnetic or electric fields is also possible.

The alignment of the elements according to the invention is reversible. It can be eliminated, for example, by heating the sample above the glass transition temperature of the liquid-crystalline substance employed. Preferably, the sample should be heated for this purpose to a temperature which is more than 5K above the corresponding glass transition temperature.

In a preferred embodiment of the process of this invention, the liquid-crystalline substance for use in the process of this invention is applied to a support substrate. The support substrate is generally planar. Examples of suitable support substrates are plastic, glass or quartz. The liquid-crystalline substance applied to the support substrate can be covered by an additional substrate. Support substrate and the additional substrate must be transparent to the illuminating light.

In a further preferred embodiment, it is possible to use unsupported films of a liquid-crystalline substance in the process of this invention.

The process is preferably suitable for an illumination perpendicularly to the sample surface. The element obtained in this way does not exhibit birefringence perpendicularly to the sample surface.

An important application of the optical elements of this invention is their use for storing information. For example, data can be stored, for example, at the exposed points, by exposure by the process of this invention. The data can be retrieved, for example, by making use of the absence of birefringence at the storage point. Said data may be, for example, pixels for digital storage, images or letters.

The process of this invention can also be used to adjust the diffusion constant D in liquid-crystalline membranes. Since liquid-crystalline membranes have, at the exposed points, a diffusion coefficient other than that at the unexposed points, the membranes can be structured in this respect by means of the process of this invention.

The process is also suitable for producing optical elements which appear transparent only in a narrow angular range but are opaque at other angles of observation (venetian-blind films). If an opaque, i.e., unaligned, strongly scattering sample is exposed to unpolarized light in a strip-type manner, a lamellar structure is produced consisting of scattering and nonscattering regions. Unscattered light is able to pass through the sample in an angular range determined by the sample thickness and the illumination geometry.

Films of the type described above can be used as a vision, glare or sun shield.

The examples below serve to further illustrate the invention. The experimental setup used in the examples and the results obtained are shown in the figures.

The following substances were synthesized by the procedure of DE 3808430 for use in the process of this invention:

SUBSTANCE I

About 0.16 ml of a 1% by weight solution of dicyclopentadiene-platinum dichloride in dichloromethane was added to a solution containing 3.0 g of 4'-phenylphenyl-4-(propen-2-oxy)benzoate, 4.9 g of cholesteryl-4-(propen-2-oxy)benzoate, 0.6 g of 4-(4-propen-2-oxy)-4'-ethoxyazobenzene and 1.1 g of tetramethylcyclotetrasiloxane in 25 ml of dry toluene and the mixture thus obtained was heated for 3 hours under reflux. The working-up was analogous to that described for substance II. About 6.2 g of a product having a glass transition temperature of 58° C. and a cholesteric phase up to the clearing point of 222° C. were obtained. The product has a reflection maximum at 560 nm in the aligned state.

SUBSTANCE II

About 0.07 ml of a 1% by weight solution of dicyclopentadienyl-platinum dichloride in dichloromethane, the solution having been prepared by processes known from the literature, such as, for example, J. Chatt, L. M. Vallarino, L. M. Venanzi, J. Chem. Soc. (London) (1957) 2496–505 and H. C. Clark, L. E. Manzer, J. Organometal. Chem. 59 (1973) 411–28, was added to a solution containing 2.0 g of 4'-phenylphenyl-4-(propen-2-oxy)-benzoate, 3.33 g of dihydrocholesteryl-4-(propen-2-oxy)benzoate, 0.86 g of 4-(4-propen-2-oxy)-4'-ethoxyazobenzene and 0.91 g of tetramethylcyclotetrasiloxane in 18 ml of dry toluene, and the resultant mixture was refluxed for 4 hours.

In order to remove fine platinum-containing precipitates, the mixture was filtered through a column 5 cm in length filled with silica gel or Tonsil. The solvent was subsequently removed by distillation under reduced pressure (26 mbar), and the residue was reprecipitated 2 to 3 times from tetrahydrofuran using ethanol and dried at 100° C. under reduced pressure (26 mbar). About 3.0 g of a product having a glass transition temperature of 54° C. and a cholesteric phase up to the clearing point of 193° C. were obtained. The product has a reflection maximum at 1080 nm in the aligned state.

SUBSTANCE III

About 0.05 ml of a 1% by weight solution of dicyclopentadieneplatinum dichloride in dichloromethane were added to a solution of 3.0 g of 4'-cyanophenyl-4-(propen-2-oxy)benzoate, 1.22 g of 4-(4-propen-2-oxy)-4'-ethoxyazobenzine and 0.86 g of tetramethylcyclotetrasiloxane in 17 ml of dry toluene and the mixture thus obtained was heated for 4 hours under reflux. The workup was analogous to that described for substance II. About 1.8 g of a product were obtained which has a glass transition temperature of 27° C. and which has an $S_A$ phase up to 137° C. and is then nematic up to the clearing point of 165° C.

SUBSTANCE IV

About 0.13 ml of a 1% by weight solution of dicyclopentadienylplatinum dichloride in dichloromethane was added to a solution containing 3.50 g of 4'-phenyl-4-(propen-2-oxy)benzoate, 5.82 g of dihydrocholesteryl-4-(propen-2-oxy)benzoate, 2.57 g of 4-(4-propen-2-oxy)-4'-ethoxyazobenzene and 1.82 g of tetramethylcyclotetrasiloxane in 30 ml of dry toluene, and the resultant mixture was refluxed for 4 hours. The workup was carried out analogously to that described for substance II.

About 10.0 g of a product having a glass transition temperature of 53° C. and a cholesteric phase up to the clearing point of 189° C. were obtained. The product has a reflection maximum at 1310 nm in the aligned state.

EXAMPLE 1

Substance I (1a in FIG. 1) was aligned with the helix axis perpendicular to the substrate (glass) between two glass plates (1b in FIG. 1) coated with polyimide as alignment aid, by heating at 140° C. and applying shear forces. The alignment of the substance can be seen from the occurrence of the reflection band at 555 nm which is typical of this phase (measurement curve 1 in FIG. 2).

Then, as shown diagrammatically in FIG. 1, sample 1 was illuminated with the directed unpolarized light from a 200W mercury high-pressure lamp 2. The heat-radiation filter used was a water cell 3 which is 4 cm in length. The light was focussed onto the sample using a quartz condenser 4. The directed light falls perpendicularly onto the surface of the sample. The spectral region of the light was restricted to form 320 to 920 nm by the water bath and the optic materials used. The light had a power of 400 nW/cm² at the sample surface. The sample was illuminated for 14 hours.

The sample illuminated in this way appeared clear and colorless when observed perpendicularly: the molecules were homeotropically aligned. The reflection band of the cholesteric phase was no longer present (measurement curve 2 in FIG. 2). The bands were detected by reflection measurements using a UV-VIS-NIR Lambda19 spectrophotometer (Perkin-Elmer) with reflection attachment.

Figure 4:
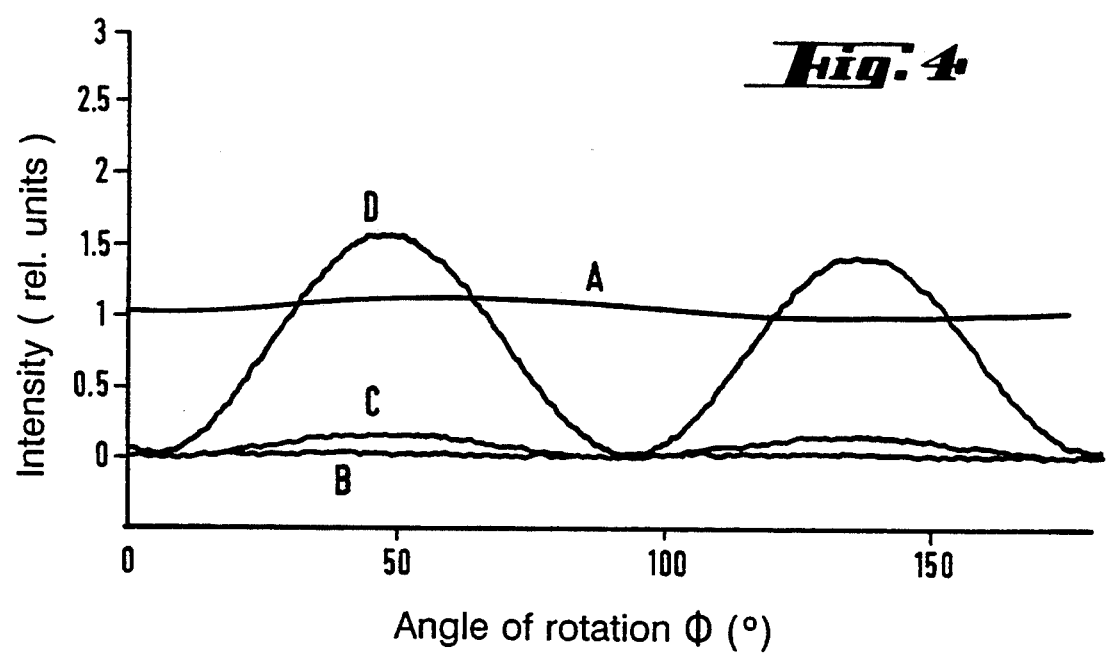
FIG. 4 shows the birefringence of the sample from Example 1, measured as the signal across the photodiode on rotating the sample through the angle $\phi$ with fixed angle $\theta$.

To demonstrate the birefringence, the following procedure was adopted (diagrammatic experimental setup, FIG. 3):

Sample 1 was illuminated with polarized light from an HeNe laser 5. The light from the HeNe laser was polarized by means of a polarizer 6. In front of the detector 7 is a polarizer 8 whose direction of polarization is aligned at an angle of 90° to the direction of polarization of the laser light. The sample according to the invention is rotated around the measurement beam with a fixed angle of tilt $\theta$ (angle of rotation $\phi$). The angle of tilt $\theta$ is 0° if the measurement beam is incident on the sample surface perpendicularly. The detector 7 used was a photodiode. The signal across the photodiode on rotating the sample through the angle of rotation $\phi$ with a fixed angle of tilt $\theta$ in each case is shown in FIG. 4. A signal is obtained with the unexposed sample for vertically incident light at all angles of rotation $\phi$ (curve A in FIG. 4). This is to be expected because of the helical structure of the liquid-crystalline substance. At the exposed point a signal across the diode is not obtained with perpendicularly incident light for any angle of rotation $\phi$ (curve B in FIG. 4). The sample is no longer birefringent in this direction.

If the sample treated according to this invention is tilted out of the perpendicular position, no signal is obtained for certain angles of rotation $\phi$ and a high signal for other angles $\phi$. This also confirms the homeotropic alignment of the molecules. If the molecules were arranged completely isotropically after carrying out the process of this invention, no brightening would result even as a result of tilting the sample. Curve C in FIG. 4 shows the measurement results for the angle of tilt $\theta = 20°$. Curve D in FIG. 4 shows the measurement results for the angle of tilt $\theta = 40°$.

EXAMPLE 2

Figure 5:
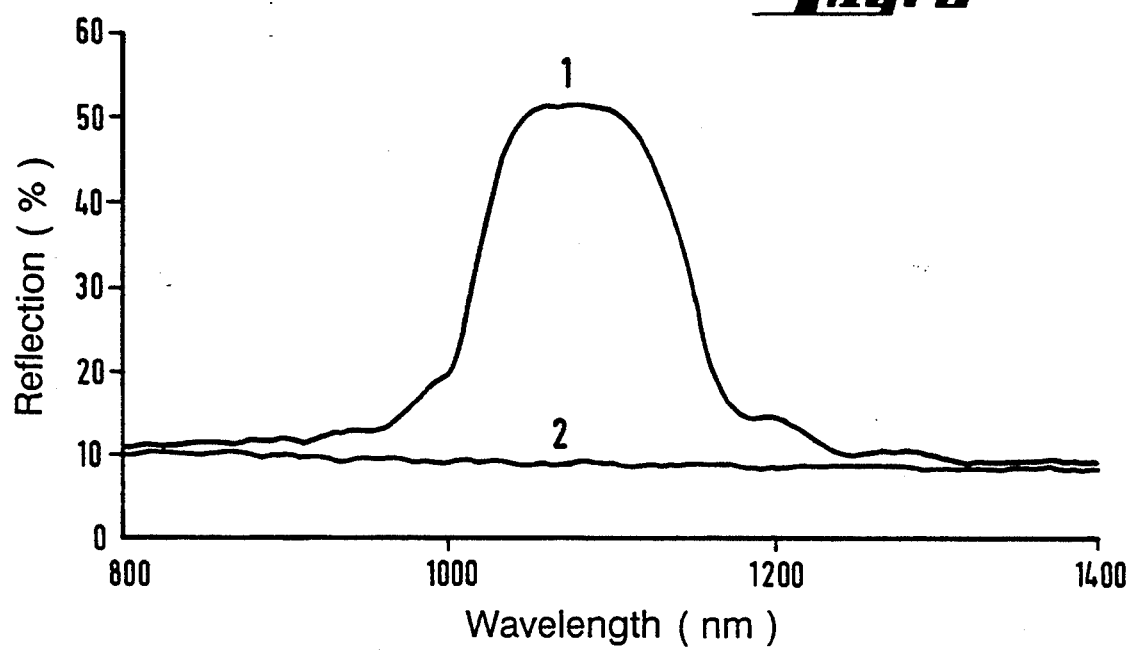
FIG. 5 shows the reflection of the sample from Example 2 at an unilluminated point 1 and an illuminated point 2.

Substance II was aligned with the helix axis perpendicular to the substrate (glass) between two glass plates coated with polyimide as alignment aid, by heating at 140° C. and applying shear forces. The alignment of the substance can be seen from the occurrence of the refection band at 1080 nm which is typical of this phase (see curve 1 in FIG. 5). The sample was then illuminated with unpolarized light analogously to Example 1 (as shown in FIG. 1: 200 W mercury high-pressure lamp, 4 cm water cell as heat-radiation filter, quartz condenser, stack of glass plates and foil polarizer for polarizing the light, spectral region of the light at the sample 320 nm–920 nm, power 200 mW/cm$^2$ at the sample surface). The illumination time was 7 hours.

The sample illuminated in this way was homeotropically aligned. It appeared clear and colorless. The reflection band of the cholesteric phase at $\gamma$ =1080 nm was no longer present (measurement curve 2 in FIG. 5).

The birefringence was measured as described in Example 1. The homeotropic alignment was demonstrated by the measurements in FIG. 6. With the unexposed sample, a signal is obtained for all angles $\theta$ with perpendicularly incident light ($\theta$ =0°) (curve A in FIG. 6).

At an exposed point, a signal across the diode is obtained with perpendicular incident light ($\theta$ =0°) for no angle of rotation $\phi$ (curve B in FIG. 4). The sample is no longer birefringent in this direction.

Figure 6:
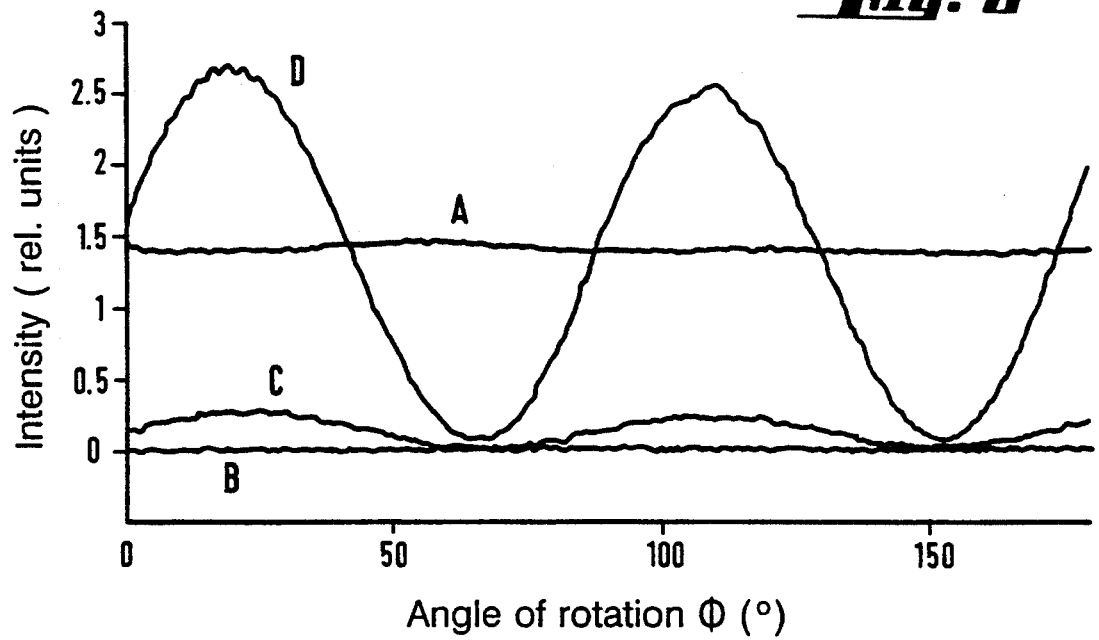
FIG. 6 shows birefringence of the sample from Example 2, represented as the signal across the photodiode on rotating the sample through the angle $\phi$ with fixed angle $\theta$.

If the sample is tilted out of the perpendicular position, no signal is obtained for certain angles $\phi$ and a high signal for other angles $\phi$. This also confirms the homeotropic alignment of the molecules in the optical component produced according to this invention. If the molecules were arranged completely isotropically after illumination, no brightening would result even as a result of tilting the sample. Curve C in FIG. 6 shows the measurement results for the angle of tilt $\theta$ =20°. Curve D in FIG. 6 shows the measurement results for the angle of tilt $\theta$ =40°.

EXAMPLE 3

Figure 7:
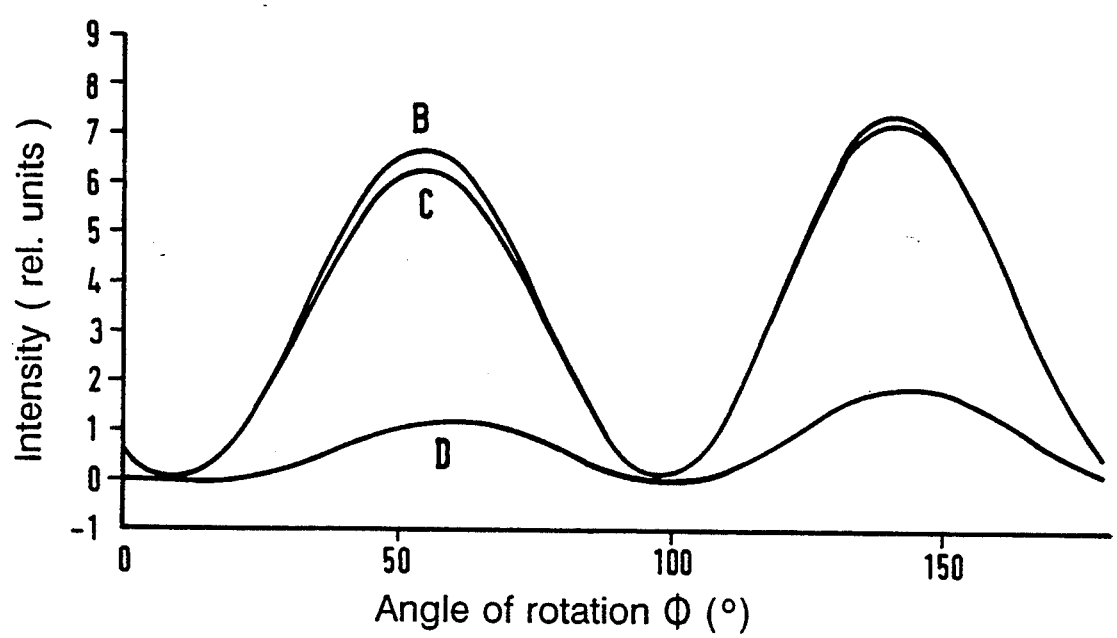
FIG. 7 shows the birefringence of the unilluminated sample from Example 3, measured as the signal across the photodiode on rotating the sample through the angle $\phi$ with fixed angle $\theta$.

Substance III was aligned in a planar manner by heating to 150° C. and shearing between two glass plates coated with polyimide as alignment aid and cooled slowly. The planar, parallel alignment was demonstrated by a birefringence measurement. The birefringence of the substance is shown in FIG. 7. Curve B shows the signal across the photodiode on rotating the unexposed sample with the angle of tilt $\theta$ =0°. Curve C shows the signal across the photodiode on rotating the unexposed sample with the angle of tilt $\theta$ =20°. Curve D shows the signal across the photodiode on rotating the unexposed sample with the angle of tilt $\theta$ =40°.

The sample was illuminated with unpolarized light as described in Example 1 (see FIG. 1, 200 W mercury high-pressure lamp, 4 cm water cell as heat-radiation filter, quartz condenser, spectral region of the light at the sample 320 nm–920 nm, power 100 mW/cm$^2$ at the sample surface). The illumination time was 15 hours.

Figure 8:
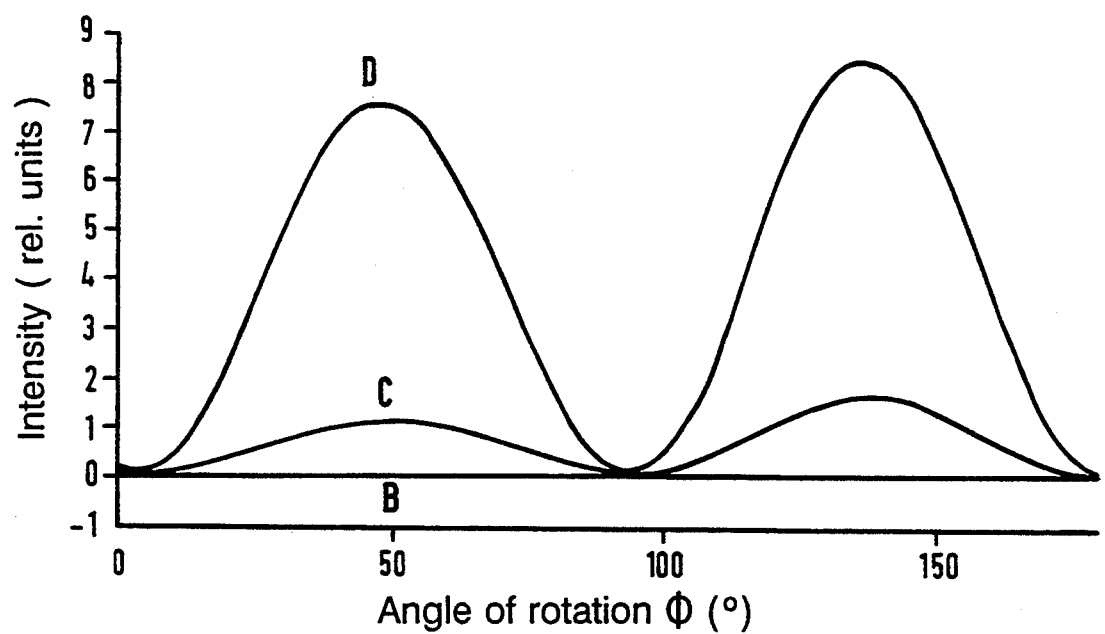
FIG. 8 shows birefringence of the illuminated sample from Example 3, represented as the signal across the photodiode on rotating the sample through the angle $\phi$ with fixed angle $\theta$.

The optical component of this invention produced by illumination appeared clear and colorless. It was homeotropically aligned. The measurement of the birefringence was carried out as described in Example 1. The birefringence was vanished for illumination perpendicularly to the surface (angle of tilt $\theta$ =0°) (curve B in FIG. 8). Curve C in FIG. 8 shows the signal across the photodiode on rotating the sample produced according to this invention with the angle of tilt $\theta$ =20°. Curve D in FIG. 8 shows the signal across the photodiode for rotation of the sample prepared according to the invention with the angle of tilt $\theta$ =40°.

EXAMPLE 4

Figure 9:
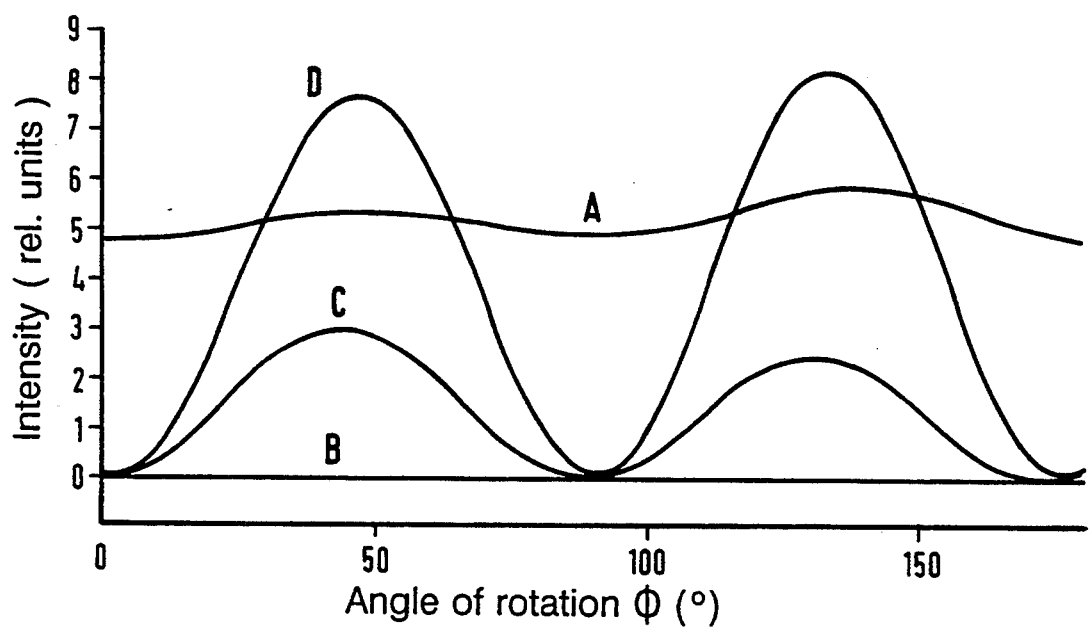
FIG. 9 shows birefringence of the sample from Example 4 before and after carrying out the process according to the invention, represented as the signal of the photodiode on rotating the sample through the angle $\phi$ with fixed angle $\theta$.

Substance I was prepared in unaligned form: a cloudy, scattering sample is obtained by heating the sample aligned in Example 1 to just above the glass transition temperature (70° C.), shearing and then quenching. The sample does not reflect light and the birefringence is approximately equal for all angles of rotation $\theta$ with vertically incident light (curve A in FIG. 9).

After illumination with the unpolarized light of a 200 W mercury high-pressure lamp analogously to Example 1 (power 0.3 W/cm$^2$, 20 hours), a homeotropic alignment was obtained. The sample appeared clear and colorless; the light scattering was considerably reduced. (One part of the sample appeared clear even after 5 hours of exposure). The light scattering values, which were determined along the lines of DIN 5036 using light of wavelength 633 nm (measurement spot 1.5 mm diameter), are summarized in Table 1. The birefringence, which was measured as in Example 1, had vanished at an angle of tilt $\theta$ =0° (curve B in FIG. 9) or varied considerably for an angle of tilt of 20° or 40°, depending in each case on the angle of rotation (curves C and D in FIG. 9, respectively).

TABLE 1

| Sample | Scattering (%) | Transmission (%) |
| --- | --- | --- |
| Aligned sample (Ex.1), unilluminated | 0.4 ± 0.2 | 87 ± 3 |
| Aligned sample (Ex.1), illuminated | 0.4 ± 0.2 | 89 ± 3 |
| Dealigned sample (Ex.4), unilluminated | 19 ± 1 | 65 ± 3 |
| Dealigned sample (Ex.4), illuminated | 1.3 ± 0.3 | 91 ± 3 |

EXAMPLE 5

Figure 10:
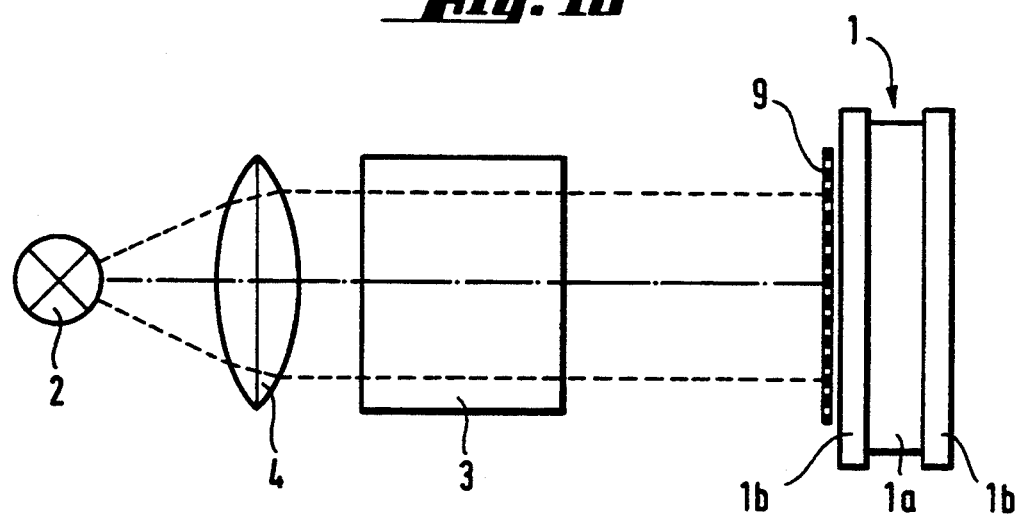
FIG. 10 shows a diagrammatic experimental setup for illumination with a photo mask, as described in Example 5.
Figure 11A:
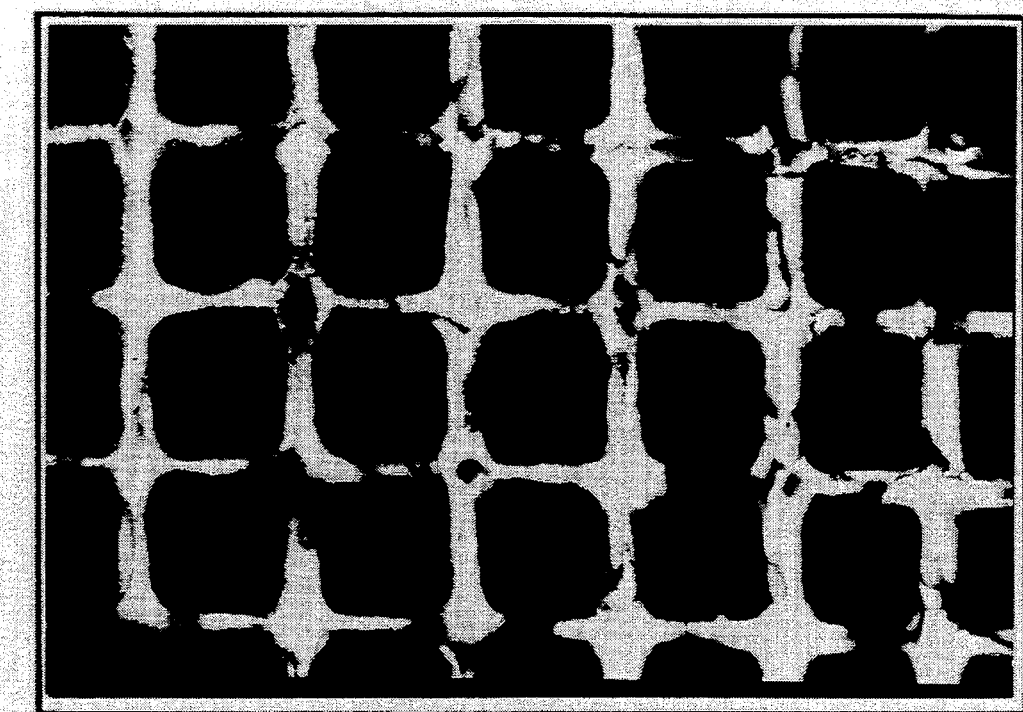
FIG. 11a shows a polarization micrograph of the sample from Example 5 in the 0° position.
Figure 11B:
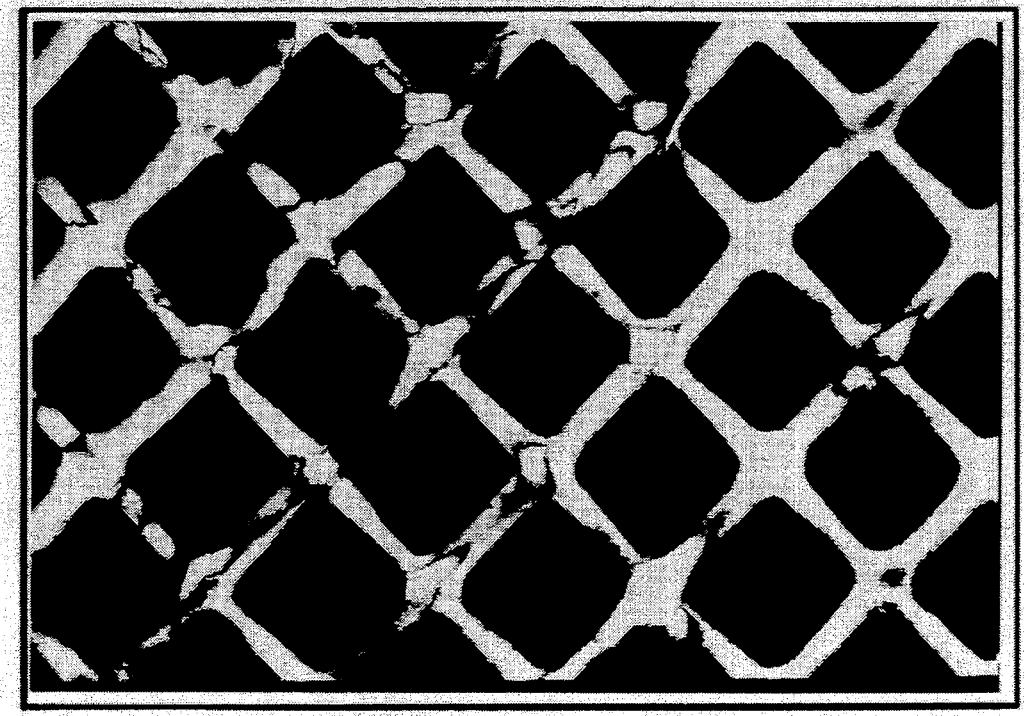
FIG. 11b shows a polarization micrograph of the sample from Example 5 in the 45° position.

Substrate IV was aligned with the helix axis perpendicular to the substrate. A pattern was written into the sample by illuminating sample 1 with the unpolarized light from a mercury high-pressure lamp 2 analogously to Example 1 (power 0.3 W/cm$^2$, 14 hours) through a photomask 9 (wire grid, mesh width 1 mm, wire thickness 0.2 mm) (diagrammatic experimental setup in FIG. 10). If the sample is viewed between crossed polarizers in a polarizing microscope, the exposed points appear dark and the unexposed points appear bright (FIG. 11a). If the sample is rotated through 45°, the exposed points remain dark (FIG. 11b). The exposed points are consequently homeotropically oriented.

EXAMPLE 6

Figure 12:
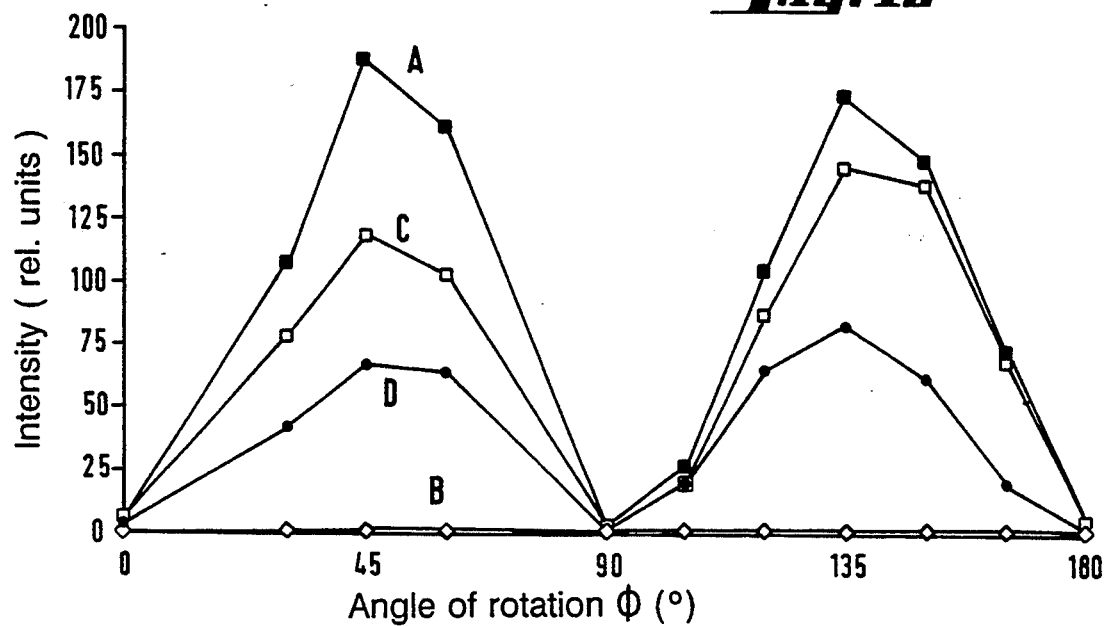
FIG. 12 shows birefringence of the sample from Example 4, measured as the signal of the photodiode on rotating the sample through the angle $\phi$ with fixed angle $\theta$.

Substance I was aligned with the helix axis perpendicular to the substrate (glass) analogously to Example 1. The sample was illuminated with the unpolarized light from a 200 W mercury high-pressure lamp (power 0.3 W/cm$^2$, 7 hours), the direction of illumination being chosen so that the illuminating light was incident on the substrate surface at an angle of 40°. An alignment is obtained which is such that the director is aligned parallel to the direction of the illuminating light in the sample. In this direction, the sample of this invention is clear and colorless. The reflection band of the cholesteric phase is no longer present. If the transmission between crossed polarizers is measured at this angle of tilt $\theta$, the transmission for all angles of rotation $\theta$ is equal to 0, i.e., the birefringence in this preferred direction has disappeared between crossed polarizers (FIG. 12, curve B). If the transmission is measured at other angles of tilt not equal to the angle at which the sample was illuminated, brightening (curves A, C and D) is again produced on rotating the sample around the light direction (angle $\theta$). The angle of incidence at which the birefringence disappears is in this case approximately 40°.

EXAMPLE 7

Figure 13A:
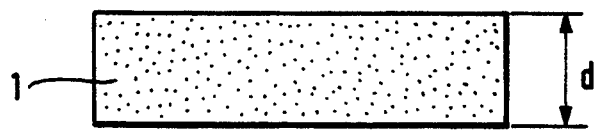
FIG. 13(A) is a diagrammatic representation of a scattered sample.
Figure 13B:
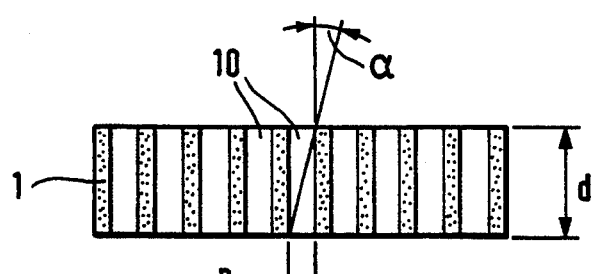
FIG. 13(B) illustrates a sample which has been exposed to unpolarized light through a photomask having a strip-type pattern (perpendicular illumination)
Figure 13C:
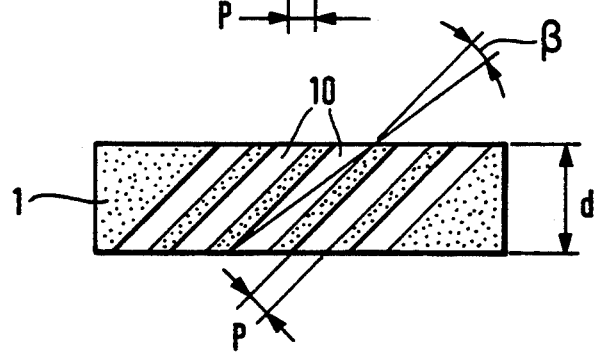
FIG. 13(C) illustrates inclined illumination at the exposed points 10.

If substance I is prepared as described in FIG. 4, a scattering sample is obtained (FIG. 13, A). If the sample is exposed with unpolarized light through a photomask having a strip-type pattern, a defined alignment of the substance (FIG. 13B for perpendicular illumination; FIG. 13C for inclined illumination) is obtained at the exposed points (10 in FIG. 13). At the exposed points, the sample no longer scatters. At the unexposed points 2, the sample continues to scatter (see Example 4 for demonstration). Unscattered light is able to pass through the sample in the angular range $\alpha$ or $\beta$ (FIG. 13, B,C). In this case, $\tan \alpha = p/d$ applies to the case of perpendicular illumination. For inclined illumination, angle $\beta$ is the result of the angle of illumination, the sample thickness d and the lamellar thickness p.

What is claimed is:

1. Optical elements based on liquid-crystalline substances which exhibit no birefringence in a defined direction of incidence, wherein said defined direction is not perpendicular to the surface of the liquid-crystalline substances.

2. A process for the production of optical elements based on liquid-crystalline substances, which comprises illuminating a liquid-crystalline substance with unpolarized light of suitable wavelength at a defined angle in such a way that, after illumination, the director of said substance is aligned parallel to the direction of the illuminating light on passing through said substance.

3. The process of claim 2, wherein the liquid-crystalline substance contains at least one photoisomerizable compound.

4. The process of claim 3, wherein the photoisomerizable compound is a photoisomerizable dye.

5. The process of claim 3, wherein unpolarized light having a wavelength in the region in which the absorption of the photoisomerizable dye of the liquid-crystalline substance lies is used.

6. The process of claim 2, wherein the illumination is carried out at an angle of 90° to the surface of the liquid-crystalline substance.

7. Information storage systems which contain the optical elements of claim 1.

8. Lens-type optical elements which contain the optical elements obtained from the process of claim 2.

9. A device for varying diffusion constant of liquid-crystalline membranes which contains the optical elements obtained from the process of claim 2.

10. Optical elements which appear transparent only in a narrow angular range but are opaque at other viewing angles which are obtained from the process of claim 2.

* * * * *